(12) United States Patent
Okamoto et al.

(10) Patent No.: US 10,847,103 B2
(45) Date of Patent: Nov. 24, 2020

(54) DISPLAY CONTROL DEVICE, DISPLAY CONTROL METHOD, AND COMPUTER-READABLE RECORDING MEDIUM

(71) Applicant: Sharp Kabushiki Kaisha, Sakai (JP)

(72) Inventors: Takuya Okamoto, Sakai (JP); Kenji Maeda, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/533,429

(22) PCT Filed: Dec. 2, 2015

(86) PCT No.: PCT/JP2015/083876
§ 371 (c)(1),
(2) Date: Jun. 6, 2017

(87) PCT Pub. No.: WO2016/093125
PCT Pub. Date: Jun. 16, 2016

(65) Prior Publication Data
US 2018/0268765 A1  Sep. 20, 2018

(30) Foreign Application Priority Data

Dec. 8, 2014 (JP) ................................ 2014-248321

(51) Int. Cl.
*G09G 3/36* (2006.01)
*G09G 3/20* (2006.01)
*G02F 1/133* (2006.01)

(52) U.S. Cl.
CPC ........... *G09G 3/3648* (2013.01); *G02F 1/133* (2013.01); *G09G 3/20* (2013.01); *G09G 3/36* (2013.01);
(Continued)

(58) Field of Classification Search
CPC ....... G09G 3/3648; G09G 310/08; H04N 5/66
(Continued)

(56) References Cited

U.S. PATENT DOCUMENTS

2003/0010894 A1 * 1/2003 Yoshihara ............ G09G 3/3406
250/208.1
2006/0001785 A1 * 1/2006 Sagano ................ G09G 3/2014
348/800
(Continued)

FOREIGN PATENT DOCUMENTS

JP       09-243996 A    9/1997
JP       2002-278658 A  9/2002
(Continued)

OTHER PUBLICATIONS

Official Communication issued in International Patent Application No. PCT/JP2015/083876, dated Mar. 8, 2016.

*Primary Examiner* — Shaheda A Abdin
(74) *Attorney, Agent, or Firm* — Keating & Bennett, LLP (57) ABSTRACT

Provided is a display control device which can display image data with improved quality while consuming less electric power. A display control section (201) includes a first frame rate setting section (22) configured to set a frame rate in accordance with a determination result determined by an image data update determining section (21) which is configured to determine, for each preset image data update period, whether image data is updated.

8 Claims, 9 Drawing Sheets

(52) U.S. Cl.
CPC ....... *G09G 3/3611* (2013.01); *G09G 2310/08* (2013.01); *G09G 2340/0435* (2013.01)

(58) Field of Classification Search
USPC .......................................... 345/204
See application file for complete search history.

(56) References Cited

U.S. PATENT DOCUMENTS

| | | |
|---|---|---|
| 2008/0136815 A1 | 6/2008 | Matsumoto |
| 2008/0165106 A1* | 7/2008 | Park ................. G09G 3/2022 345/89 |
| 2009/0251445 A1 | 10/2009 | Ito et al. |
| 2010/0013995 A1* | 1/2010 | Um ..................... G06F 1/3203 348/500 |
| 2011/0084971 A1 | 4/2011 | Kuo et al. |
| 2013/0111241 A1* | 5/2013 | Ha ..................... H04W 52/029 713/322 |
| 2013/0262890 A1* | 10/2013 | Marshall ............. G06F 1/3212 713/320 |
| 2014/0022234 A1 | 1/2014 | Ogawa et al. |
| 2015/0146097 A1 | 5/2015 | Izumi |
| 2017/0092340 A1* | 3/2017 | Zheng ................ G11C 7/1072 |

FOREIGN PATENT DOCUMENTS

| | | |
|---|---|---|
| JP | 2007-036702 A | 2/2007 |
| JP | 2008-142417 A | 6/2008 |
| JP | 2009-251607 A | 10/2009 |
| JP | 2011-013473 A | 1/2011 |
| TW | 201113864 A1 | 4/2011 |
| WO | 2013/035594 A1 | 3/2013 |
| WO | 2013/175735 A1 | 11/2013 |

* cited by examiner

DISPLAY CONTROL DEVICE, DISPLAY CONTROL METHOD, AND COMPUTER-READABLE RECORDING MEDIUM

TECHNICAL FIELD

The present invention relates to a display control device which controls a display panel to display image data while switching between at least two frame rates.

BACKGROUND ART

Figure 9:
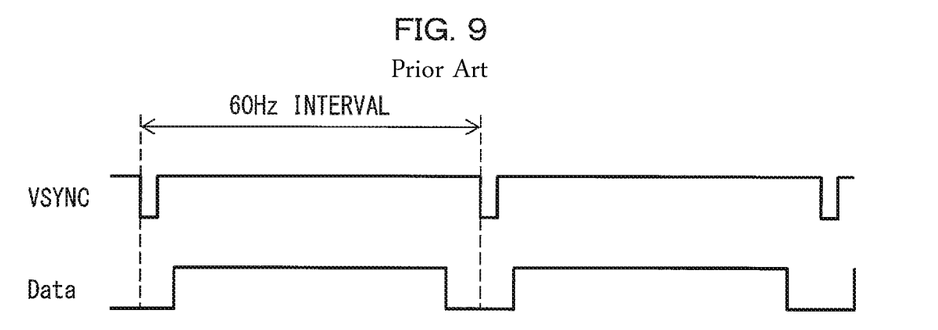
FIG. 9 is a timing chart showing the timing of a data transmission in a conventional display device.

In order to prevent flickers and the like, a conventional liquid crystal display device for a mobile device always updates data at intervals of 60 Hz in accordance with a vertical synchronization signal (VSYNC) (see FIG. 9).

However, in a case where data is updated at intervals of 60 Hz in accordance with a vertical synchronization signal (VSYNC), i.e., in a case where a driving frequency is 60 Hz, the liquid crystal display device cannot respond to quick movements in motion image data or the like. This can cause a reduction in display quality.

In view of the circumstances, attempts have been made to improve display quality of a liquid crystal display device (e.g., to smoothly display motion image data) by increasing the driving frequency from 60 Hz to 120 Hz.

In a case where the driving frequency is increased from 60 Hz to 120 Hz, a driving timing will also be doubled. This causes an increase in electric power consumption. On this account, various techniques have been proposed to prevent an increase in electric power consumption.

For example, Patent Literature 1 discloses a technique of reducing electric power consumption as compared with a case where a display panel is always operated at a double speed. According to the above technique, a moving amount of a plurality of frame data groups, which constitute motion image data, is detected. In a case where the moving amount thus detected is equal to or greater than a threshold which indicates a certain moving amount, a display panel is operated at a double speed. In a case where the moving amount is smaller than the threshold, the display panel is not operated at a double speed.

CITATION LIST

Patent Literature

[Patent Literature 1]
Japanese Patent Application Publication Tokukai No. 2011-13473 (Publication Date: Jan. 20, 2011)

SUMMARY OF INVENTION

Technical Problem

However, in a case where double speed driving is selected based on a moving amount of image data as with the technique disclosed in Patent Literature 1, a process needs to be continued for a plurality of frames so as to detect the moving amount. This causes an increase in, for example, circuit scale, and consequently causes an increase in electric power consumption.

As has been discussed above, with the technique disclosed in Patent Literature 1, electric power consumption cannot be sufficiently reduced, and it is therefore not possible to improve quality of displayed image data while reducing electric power consumption.

The present invention has been attained to address the above problem, and an objective of the present invention is to provide a display control device which can display image data with improved quality while consuming less electric power.

Solution to Problem

In order to attain the above objective, a display control device in accordance with an aspect of the present invention is a display control device, which controls a display panel to display image data by switching between at least two frame rates, the display control device including: an image data update determining section configured to determine, for each preset image data update period, whether externally-supplied image data is updated; and a first frame rate setting section configured to set a frame rate in accordance with a determination result determined by the image data update determining section.

Advantageous Effects of Invention

An aspect of the present invention brings about an effect of improving quality of displayed image data while reducing electric power consumption.

DESCRIPTION OF EMBODIMENTS

Embodiment 1

The following description will specifically discuss Embodiment 1 of the present invention. Note that the present invention is applicable to a display device in which a frame rate can be changed. Embodiment 1 will discuss an example of a display device that displays image data by switching between (i) a frame rate of 120 Hz at which double speed driving is carried out and (ii) a frame rate of 60 Hz at which normal driving is carried out.

(Display Device)

Figure 1:
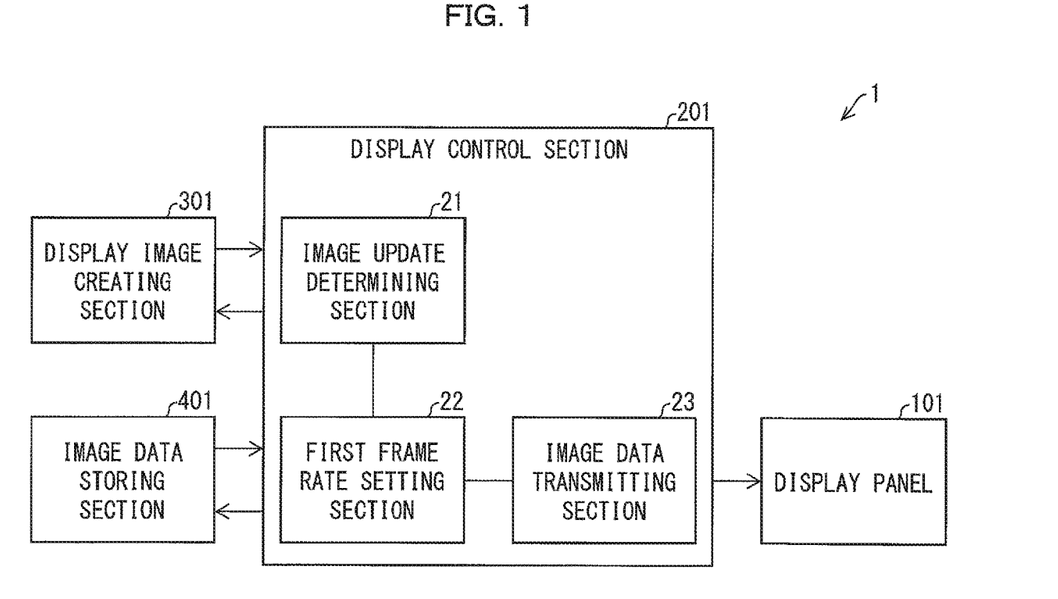
FIG. 1 is a block diagram schematically illustrating a configuration of a display device in accordance with Embodiment 1 of the present invention.
Figure 2:
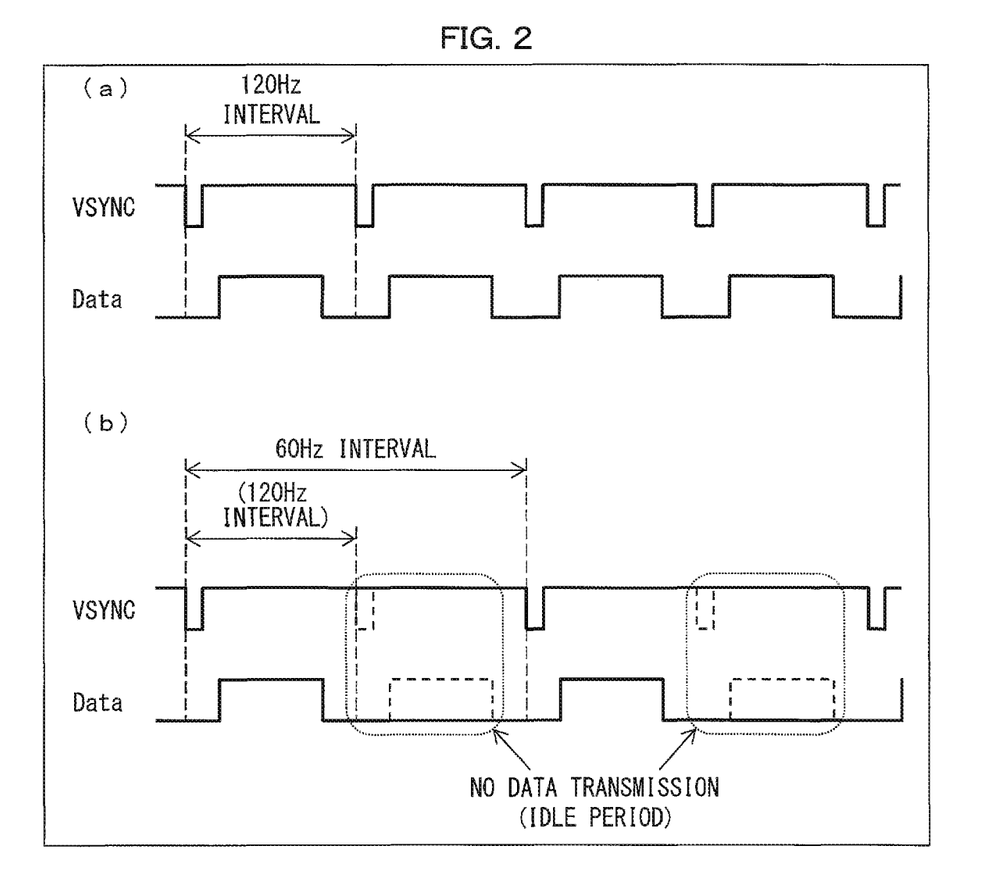
FIG. 2 includes timing charts each showing the timing of a data transmission in the display device illustrated in FIG. 1. (a) of FIG. 2 is a timing chart of a case where a frame rate is 120 Hz. (b) of FIG. 2 is a timing chart of a case where the frame rate is 60 Hz.

FIG. 1 is a block diagram schematically illustrating a configuration of a display device 1. (a) and (b) of FIG. 2 are timing charts each showing the timing of a data transmission in the display device 1 illustrated in FIG. 1.

The display device 1 includes a display panel 101, a display control section 201, a display image creating section 301, and an image data storing section 401 (see FIG. 1).

The display panel 101 displays image data such as still image data and motion image data. The display panel 101 is a display device, such as a liquid crystal display panel, in which a frame rate can be changed.

The display control section 201 is a display control device which controls the display panel 101 to display image data by switching between two frame rates (e.g., 120 Hz and 60 Hz).

The display image creating section 301 creates, based on an externally-supplied image signal, image data which is to be displayed by the display panel 101, and transmits the image data thus created to the display control section 201.

The image data storing section 401 temporarily stores therein the image data which the display control section 201 receives from the display image creating section 301. The image data, thus temporarily stored in the image data storing section 401, is read out by the display control section 201 as necessary. That is, the image data storing section 401 is a video random access memory (VRAM) that temporarily stores image data which is supplied from the display image creating section 301 and which is to be transmitted to the display panel 101.

The display control section 201 includes an image update determining section (image data update determining section) 21, a first frame rate setting section 22, and an image data transmitting section 23. The image update determining section 21 makes a determination, for each preset image data update determination period, whether the image data, stored in the image data storing section 401, is updated. The first frame rate setting section 22 sets a frame rate in accordance with a determination result determined by the image update determining section 21. The image data transmitting section 23 creates a vertical synchronization signal (VSYNC) based on the frame rate set by the first frame rate setting section 22, and then transmits, to the display panel 101, the image data at a timing based on the VSYNC thus created.

That is, the display control section 201 (*i*) sets a frame rate in accordance with a determination result, as to whether the image data is updated, which is determined for each preset image data update determination period, (ii) creates a timing (display data update timing), at which display data is to be updated, based on the frame rate thus set, and (iii) transmits the image data to the display panel 101 at the timing thus created.

The image data update determination period in accordance with Embodiment 1 is, for example, a period which corresponds to 120 Hz. That is, according to Embodiment 1, it is determined, at a period which corresponds to 120 Hz, whether the image data is updated. Note that the image data update data determination period is not limited as such. The image data update determination period can alternatively be a period which corresponds 60 Hz or another frequency.

According to the display control section 201, display data is normally updated at a display data update timing of 120 Hz (corresponding to double speed driving) as illustrated in (a) of FIG. 2. In a case where no performance is required or no image data is updated, the display control section 201 sets the display data update timing to 60 Hz at which normal driving is carried out as illustrated in (b) of FIG. 2. Note that the display data update timing of 60 Hz (see (b) of FIG. 2) is realized by thinning out frames at a display data update timing of 120 Hz. Specifically, as illustrated in (b) of FIG. 2, a period (idle period during which no data is transmitted) is secured by thinning out frames from a data transmission interval which corresponds to 120 Hz (see (a) of FIG. 2) so that a data is transmitted at intervals of 60 Hz. A data transmission interval of 60 Hz, i.e., the display data update timing of 60 Hz, is thus realized.

In a case where, for example, no image data is transmitted from the display image creating section 301 at a given timing, the display control section 201 (*i*) determines that no image data is updated, (ii) reads out the image data from the image data storing section 401, and then (iii) transmits, as appropriate, the image data thus read out to the display panel 101. The display control section 201 determines such a case as the case where no performance is required, and then suspends a transmission of the image data to the display panel 101 by setting the idle period as illustrated in (b) of FIG. 2. The display control section 201 thus reduces the frame rate from 120 Hz to 60 Hz.

Note that whether the image data is updated can be determined in accordance with whether the image data stored in the image data storing section 401 is updated.

The frame rate is thus reduced in a case where no performance is required or no image data is updated. This makes it possible to reduce electric power consumption as compared with a case where the frame rate is always set high.

(Display Control Process: Display Control Method)

Figure 3:
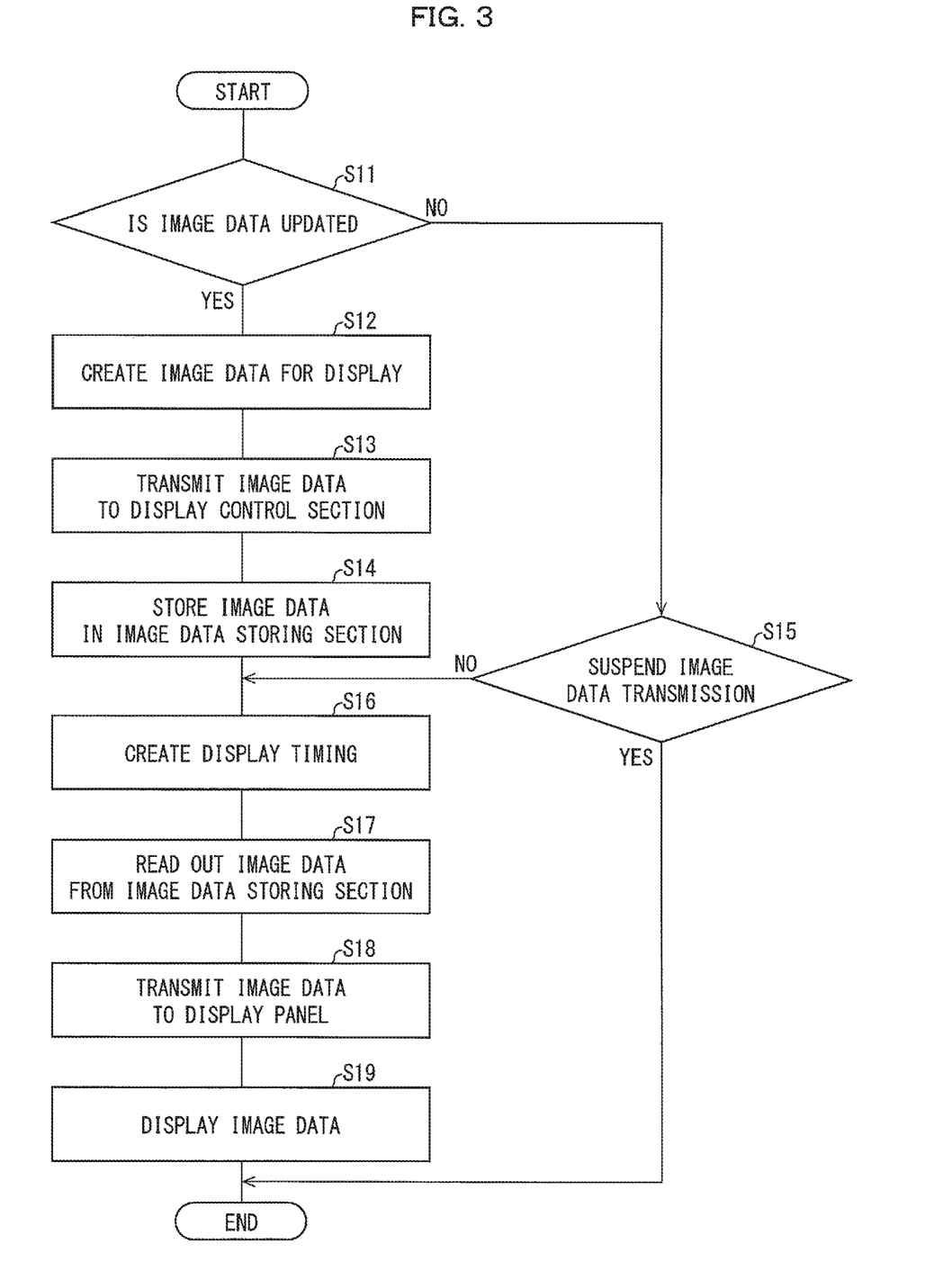
FIG. 3 is a flowchart illustrating a flow of a display control process in the display device illustrated in FIG. 1.

The following description will discuss, with reference to a flowchart illustrated in FIG. 3, a display control process in the display control section 201 configured as discussed above. Note that it is assumed that (i) a normal frame rate of the display device 1 is 120 Hz and (ii) in a case where no performance is required or no image data is updated, the frame rate is reduced from 120 Hz to 60 Hz. It follows that, in Embodiment 1, the frame rate has an upper limit of 120 Hz.

The image update determining section 21 of the display control section 201 first determines whether image data is updated (S11). In a case where the image update determining section 21 determines that the image data is updated, it controls the display image creating section 301 to (i) create image data for display (S12) and (ii) transmit the image data thus created to the display control section 201 (S13).

After that, the image update determining section 21 of the display control section 201 stores, in the image data storing section 401, the image data received from the display image creating section 301 (S14).

Subsequently, the image data transmitting section 23 of the display control section 201 creates a display timing (VSYNC) (S16). Note that, since the image update determining section 21 has determined, in the step S11, that the image data is updated, the image data transmitting section 23 creates a display timing (VSYNC) at which display data can be updated at intervals (frame rate) of 120 Hz which is set by the first frame rate setting section 22.

After that, the image data transmitting section 23 of the display control section 201 reads out, at the display timing thus created, the image data from the image data storing section 401 (S17), and then transmits the image data thus read out to the display panel 101 (S18). The display panel 101 finally displays the image data thus received from the display control section 201.

In contrast, the step S15 is proceeded with in a case where the image update determining section 21 of the display control section 201 determines, in the step S11, that no image data is updated.

In the step S15, the first frame rate setting section 22 of the display control section 201 (i) receives, from the image update determining section 21, a signal which indicates that no image data is updated and then (ii) determines whether to suspend transmission of the image data. "To suspend transmission of image data" as used herein means "to set the idle period" illustrated in (b) of FIG. 2 as has been discussed.

In the step S15, whether to suspend transmission of the image data is determined by, for example, checking whether image data was displayed in a previous frame. Whether image data was displayed in the previous frame can be checked in accordance with, for example, (i) whether the image data stored in the image data storing section 401 is updated or (ii) whether image data is transmitted from the display image creating section 301 at a given timing (image data update determining step). That is, in a case where the image data is updated, the first frame rate setting section 22 (i) determines that image data was displayed in the previous frame and (ii) determines to suspend transmission of the image data (i.e., Yes in S15) and ends the process. In a case where transmission of the image data is suspended, display data is updated at the frame rate of 60 Hz as illustrated in (b) of FIG. 2 (frame rate setting step).

In a case where no image data was displayed in a previous frame (i.e., No in S15), the step S16 is proceeded with so that display data of the display panel 101 is updated. In S15, a display timing is created and identical processes, as with a case where the image data is updated in the step S11, are carried out.

By thus determining that the image data is updated, the display control section 201 updates display data at the frame rate of 60 Hz instead of 120 Hz at which the display data is normally updated. This makes it possible to reduce electric power consumption as compared with a case where display data is always updated at the frame rate of 120 Hz.

Function and Effect

According to the display device 1 configured as discussed above, in a case where the image update determining section 21 determines that no image data is updated, the first frame rate setting section 22 sets a frame rate to a frame rate (60 Hz) which is lower than a frame rate (120 Hz) which was set in a previous image data update determination.

Therefore, in a case where the image update determining section 21 determines that no image data is updated, the frame rate is set to a frame rate (60 Hz) lower than a frame rate (120 Hz) which was set in the previous image data update determination. This makes it possible to reduce electric power consumption as compared with a case where the frame rate is always set to 120 Hz.

Note that the above description deals with an example where the frame rate is changed between 120 Hz and 60 Hz. Embodiment 1 is, however, of course not limited as such, and the frame rate can be set within any range within which the display device can operate. In a case where a liquid crystal display device is employed in which the frame rate can be changed, for example, within a range from 120 Hz to 1 Hz, the frame rate can be changed between two given frame rates within the range from 120 Hz to 1 Hz.

In Embodiment 1, a frame rate whose upper limit is 120 Hz is employed and no explanation is made as to how to set the upper limit of the frame rate. How to set the upper limit of the frame rate will be later discussed in Embodiments 2 through 4. Note that, as with Embodiment 1, each of Embodiments 2 through 4 employs a frame rate whose upper limit can be set within any range within which the display device can operate. In a case where a liquid crystal display device is employed in which the frame rate can be changed, for example, within a range from 120 Hz to 1 Hz, an upper limit of the frame rate can be set within such a range from 120 Hz to 1 Hz.

Embodiment 2

The following description will discuss Embodiment 2 of the present invention. For convenience, members having the same functions as those explained in Embodiment 1 are given the same reference signs, and their explanations are omitted.

(Display Device)

Figure 4:
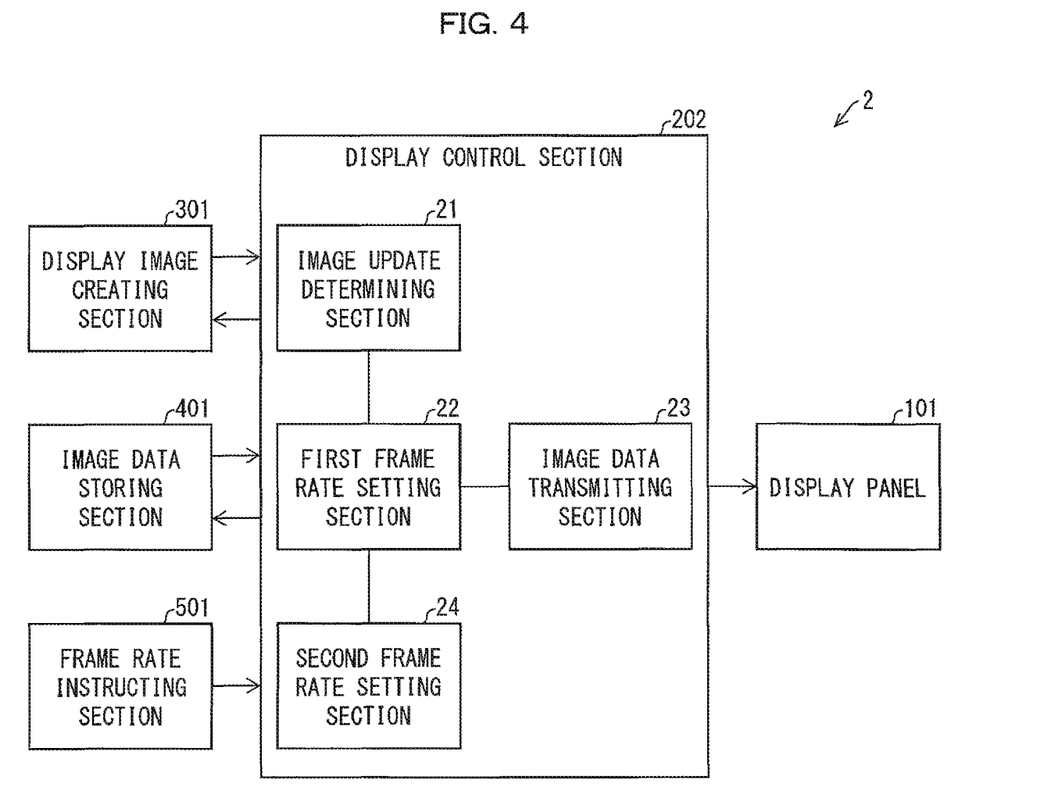
FIG. 4 is a block diagram schematically illustrating a configuration of a display device in accordance with Embodiment 2 of the present invention.

FIG. 4 is a block diagram schematically illustrating a configuration of a display device 2 in accordance with Embodiment 2. In addition to the configuration of the display device 1 illustrated in FIG. 1, the display device 2 further includes (i) a frame rate instructing section 501 via which a user can instruct a frame rate and (ii) a display control section 202, instead of the display control section 201 illustrated in FIG. 1. In the display control section 202, a second frame rate setting section 24, configured to set an upper limit of the frame rate which the user sets via the frame rate instructing section 501, is added to the configuration of the display control section 201.

The frame rate instructing section 501 is configured so that the user can select a frame rate of, for example, 120 Hz or 60 Hz and so as to transmit the frame rate thus selected to the second frame rate setting section 24 of the display control section 202.

In a case where the frame rate, received from the frame rate instructing section 501, is 60 Hz, the second frame rate setting section 24 determines that an upper limit of the frame rate is 60 Hz and transmits the upper limit to the first frame rate setting section 22.

In a case where the frame rate received from the frame rate instructing section 501 is 120 Hz, the second frame rate setting section 24 (i) determines that the upper limit of the frame rate is 120 Hz and (ii) transmits an upper limit to the first frame rate setting section 22.

That is, in a case where an upper limit of the frame rate is set via the second frame rate setting section 24, the first frame rate setting section 22 sets the frame rate, which is to be set by the first frame rate setting section 22, to have the upper limit set by the second frame rate setting section 24.

(Case where User Selects Frame Rate of 60 Hz)

In a case where the user selects the frame rate of 60 Hz, the second frame rate setting section 24 instructs the first frame rate setting section 22 to set the upper limit of the frame rate to 60 Hz. The first frame rate setting section 22 in turn instructs an image data transmitting section 23 to transmit image data to a display panel 101 such that the frame rate will not exceed 60 Hz.

Note that the frame rate which the user can set is, of course, not fixed to 120 Hz or 60 Hz. The user can set any frame rate within a range within which the display device can operate.

The image data transmitting section 23 determines a timing (i.e., a display timing) at which the image data is to be transmitted to the display panel 101. An update timing, at which a creation of the image data is updated by the display image creating section 301, matches the display timing (VSYNC). Therefore, the image data transmitting section 23 transmits the image data to the display panel 101 at the display timing created by itself.

Specifically, by reducing, to half, the number of times of each of (i) rising edges and (ii) falling edges of the display timing (VSYNC) created by the image data transmitting section 23, it is also possible for the display image creating section 301 to create image data at intervals of 60 Hz (see (b) of FIG. 2). This ultimately allows idle driving to be carried out.

(Case where User Selects Frame Rate of 120 Hz)

In such a case, the image data transmitting section 23 sets the frame rate to have an upper limit of 120 Hz. Therefore, in a case where the image data is successively updated, image data will be successively transmitted to the display panel 101 at intervals of 120 Hz.

An effect of displaying image data at a frame rate which a user demands can be brought about by thus setting a frame rate, which the user has instructed via the frame rate instructing section 501, to the upper limit of the frame rate which is to be set by the first frame rate setting section 22.

According to Embodiment 2, in addition to the configuration of Embodiment 1, the user sets the upper limit of the frame rate so that the user's demand is met. The upper limit of the frame rate can alternatively be set in accordance with remaining battery power, as will be discussed below in Embodiment 3.

Embodiment 3

The following description will discuss Embodiment 3 of the present invention. For convenience, members having the same functions as those explained in Embodiments 1 and 2 are given the same reference signs, and their explanations are omitted.

(Display Device)

Figure 5:
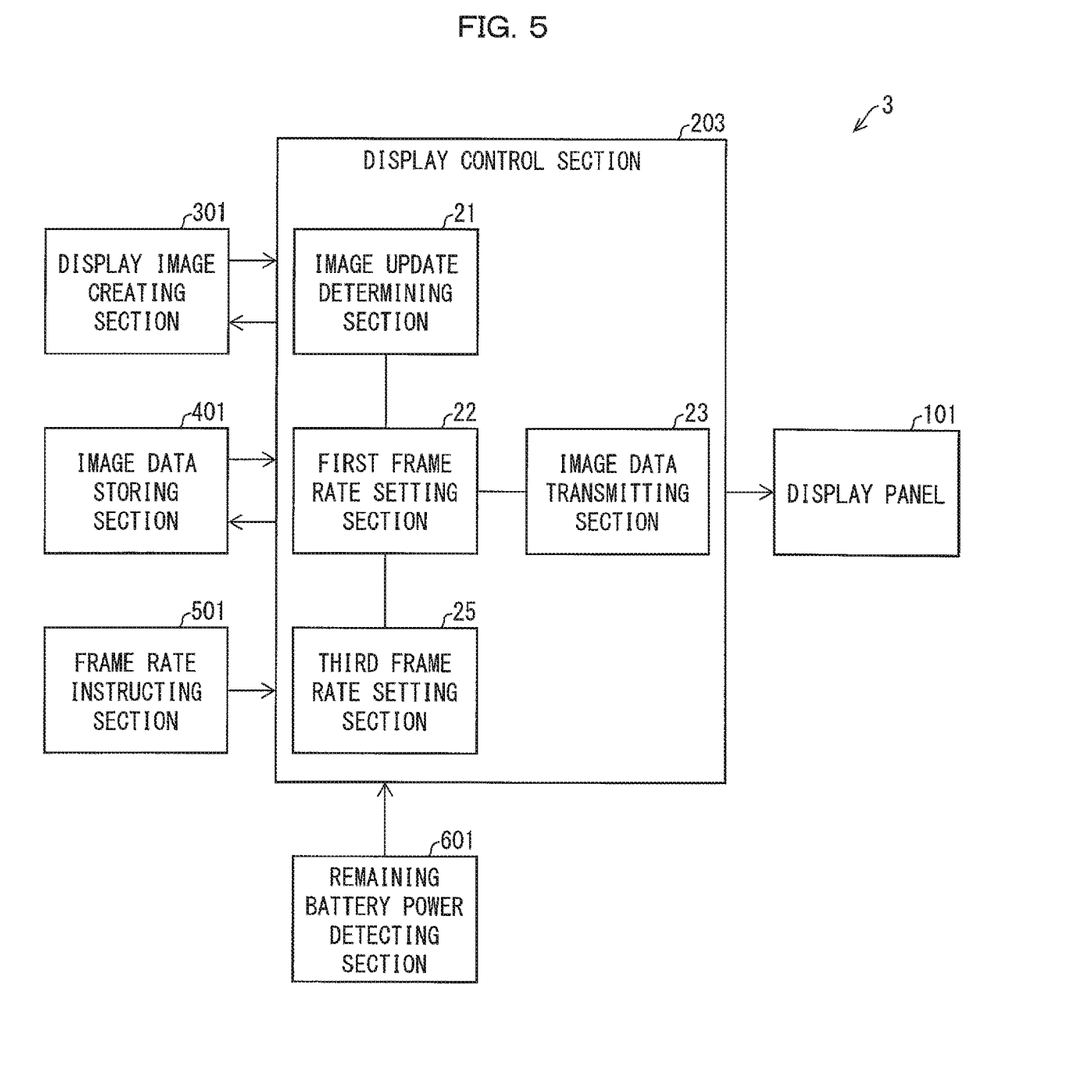
FIG. 5 is a block diagram schematically illustrating a configuration of a display device in accordance with Embodiment 3 of the present invention.

FIG. 5 is a block diagram schematically illustrating a configuration of a display device 3 in accordance with Embodiment 3. In addition to the configuration of the display device 2 illustrated in FIG. 4, the display device 3 further includes (i) a remaining battery power detecting section (remaining battery power checking section) 601 configured to detect (check) remaining battery power of the display device 3 and (ii) a display control section 203 instead of the display control section 202 illustrated in FIG. 4. In the display control section 203, a third frame rate setting section 25, configured to set an upper limit of a frame rate in accordance with a detection result (remaining battery power) detected by the remaining battery power detecting section 601, is added to the configuration of the display control section 202.

In a case where the third frame rate setting section 25 sets an upper limit of a frame rate, such an upper limit is employed as an upper limit of a frame rate which is to be set by a first frame rate setting section 22.

That is, in a case where the third frame rate setting section 25 sets an upper limit of a frame rate, the first frame rate setting section 22 sets a frame rate, which is to be set by the first frame rate setting section 22, to have the upper limit set by the third frame rate setting section.

(Frame Rate Setting Process)

Figure 6:
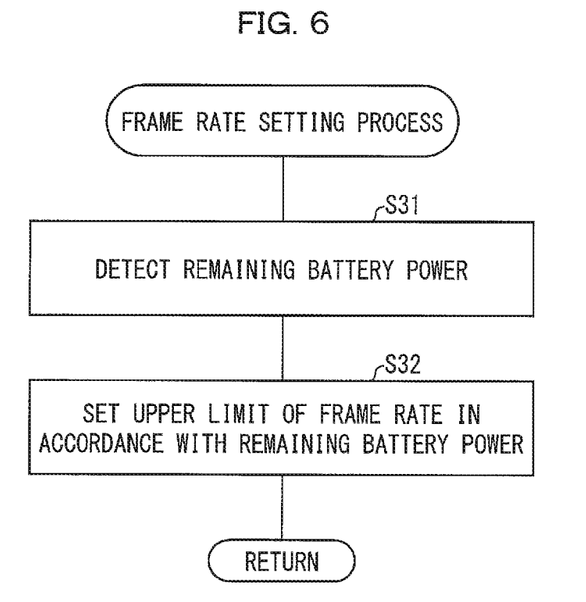
FIG. 6 is a flowchart illustrating a flow of a frame rate setting process in the display device illustrated in FIG. 5.

FIG. 6 is a flowchart illustrating a flow of a frame rate setting process in the third frame rate setting section 25 of the display device 3 illustrated in FIG. 5. Note that the frame rate setting process is to be carried out before the first step (S11) of the flowchart (FIG. 3) used to discuss Embodiment 1.

The third frame rate setting section 25 detects remaining battery power based on a signal received from the remaining battery power detecting section 601 (S31), and sets an upper limit of the frame rate in accordance with the remaining battery power thus detected (S32).

According to Embodiment 3, a target, which is subjected to checking of remaining power, is a battery of the display device 3. Embodiment 3 is, however, not limited as such. Any battery of an electronic device, which includes a display control section 203, can be subjected to such checking.

In addition to the setting of the upper limit in Embodiment 2, according to Embodiment 3, the upper limit of the frame rate is set in accordance with remaining battery power. Alternatively, an upper limit of the frame rate can be set for each application to be executed, as will be discussed below in Embodiment 4.

Embodiment 4

The following description will discuss Embodiment 4 of the present invention. For convenience, members having the same functions as those explained in Embodiments 1 through 3 are given the same reference signs, and their explanations are omitted.

(Display Device)

Figure 7:
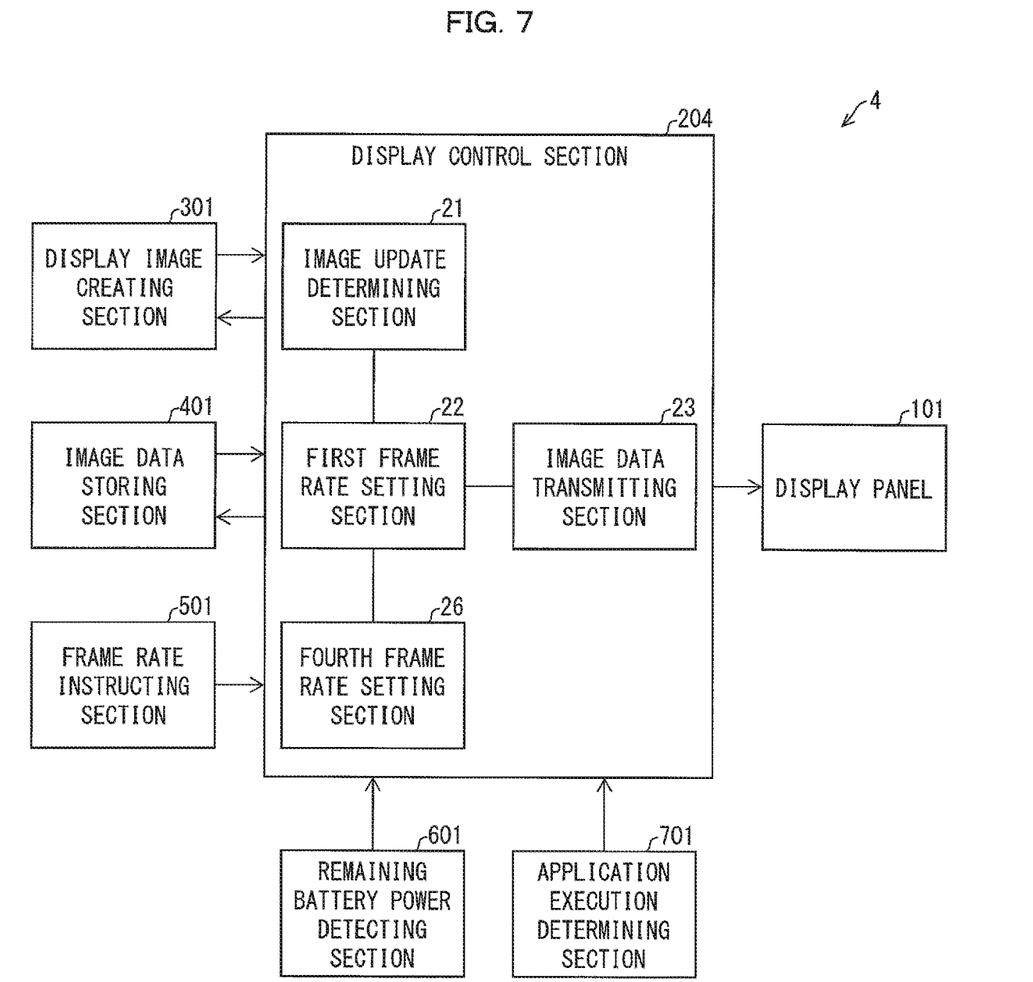
FIG. 7 is a block diagram schematically illustrating a configuration of a display device in accordance with Embodiment 4 of the present invention.

FIG. 7 is a block diagram schematically illustrating a configuration of a display device 4 in accordance with Embodiment 4. Embodiment 4 will discuss a case where the display device 4 is included in a portable information terminal, such as a smartphone, which can execute an application.

In addition to the configuration of the display device 3 illustrated in FIG. 5, the display device 4 further includes (i) an application execution determining section 701 configured to determine an application which is being executed and (ii) a display control section 204 instead of the display control section 203 illustrated in FIG. 5. In the display control section 204, a fourth frame rate setting section 26, configured to set an upper limit of a frame rate in accordance with a determination result determined by the application execution determining section 701, is added to the configuration of the display control section 203. Note that the application execution determining section 701 transmits, to the display control section 204, a signal (application identifying signal) for identifying an executing application as the determination result.

The fourth frame rate setting section 26 includes a table in which applications to be executed are associated with respective upper limits of the frame rate. Upon receipt of the application identifying signal, the fourth frame rate setting section 26 refers to the table and sets an upper limit of a frame rate. The upper limit thus set by the fourth frame rate setting section 26 is employed as an upper limit of a frame rate which is to be set by a first frame rate setting section 22.

That is, the first frame rate setting section 22 sets the upper limit of the frame rate in accordance with the application which (i) is being executed and (ii) has been identified by the application execution determining section 701.

(Frame Rate Setting Process)

Figure 8:
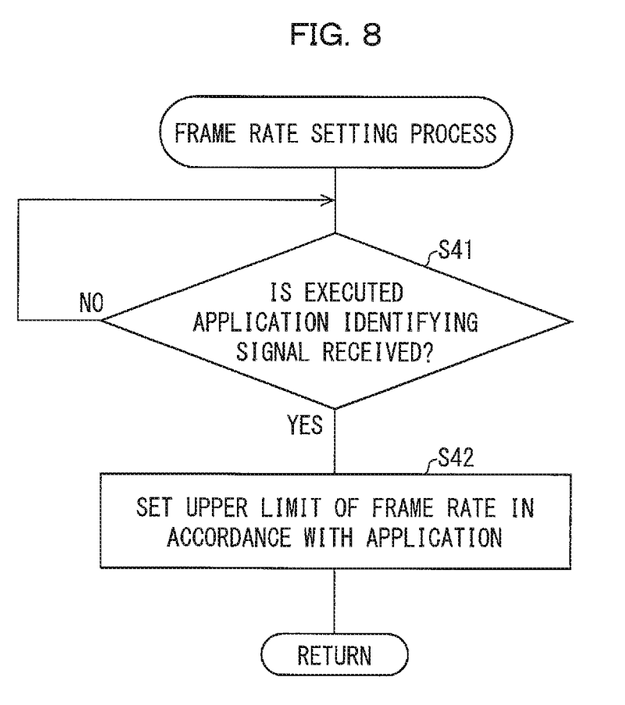
FIG. 8 is a flowchart illustrating a flow of a frame rate setting process in the display device illustrated in FIG. 7.

FIG. 8 is a flowchart illustrating a flow of a frame rate setting process in the fourth frame rate setting section 26 of the display device 4 illustrated in FIG. 7. Note that the frame rate setting process is to be carried out before the first step (S11) of the flowchart (FIG. 3) used to discuss Embodiment 1.

An upper limit of a frame rate, at which a display panel 101 displays image data of an application which is being executed, is preset for each application. In a case where, for example, an application involving hard actions, such as a race game, is executed, the upper limit of the frame rate is set to 120 Hz because performance is required. In contrast, in a case where an application, such as a quiz game, involving less change in image data is executed, the upper limit of the frame rate is set to 60 Hz because no performance is required.

The fourth frame rate setting section 26 first determines, based on a determination result determined by the application execution determining section 701, whether it has received an application identifying signal (S41). In a case of receiving the application identifying signal, the fourth frame rate setting section 26 sets the upper limit of the frame rate in accordance with the application which is being executed, and ends the process (S42).

Note that according to the flowchart illustrated in FIG. 8, an upper limit, of the frame rate, which is preset for each application is automatically used as the upper limit of the frame rate which is to be set by the first frame rate setting section 22. Embodiment 4 is, however, not limited as such. Alternatively, the upper limit can be automatically set, by (i) measuring an update timing of image data when an application is executed for the first time so that an upper limit of a frame rate is calculated, (ii) storing the upper limit thus calculated, (iii) automatically setting, when the application is executed for the second time, the upper limit thus stored as an upper limit of the frame rate to be set by the first frame rate setting section 22, and so on.

Alternatively, the upper limit of a frame rate can be set by a user for each application to be executed. Alternatively, the upper limit of a frame rate can be preset for each producer of an application.

Embodiment 4 has discussed an example where the display device 4 is included in a portable information terminal, such as a smartphone, which can execute an application. The display device 4 is, however, not limited to be included in a portable information terminal, provided that it is included in an electronic device that can execute an application.

Embodiments 2 through 4 each specifically discuss (i) how to set the upper limit of a frame rate and (ii) that the lower limit of a frame rate is 60 Hz. The lower limit is, however, not limited as such, provided that the lower limit is determined in accordance with a type of liquid crystal employed in the display panel 101. In a case where a liquid crystal panel employing, for example, an oxide semiconductor, the display device can reduce the frame rate to 1 Hz.

The present invention is not limited to Embodiments 1 through 4 and is applicable, for example, to (i) a display device in which a frame rate can be changed and (ii) an electronic device, such as a personal computer, which includes such a display device. Since the present invention brings about an effect of reducing electric power consumption, the present invention is particularly applicable to a portable electronic device, a smartphone, a laptop computer, a game machine, or the like.

Software Implementation Example

A control block of each of the display control sections 201 through 204 (particularly, the first frame rate setting section 22, the second frame rate setting section 24, the third frame rate setting section 25, and the fourth frame rate setting section 26) can be realized by a logic circuit (hardware) provided in an integrated circuit (IC chip) or the like or can be alternatively realized by software as executed by a central processing unit (CPU).

In the latter case, each of the first frame rate setting section 22, the second frame rate setting section 24, the third frame rate setting section 25, and the fourth frame rate setting section 26 includes a CPU that executes instructions of a display control program that is software realizing the foregoing functions; a read only memory (ROM) or a storage device (each referred to as "storage medium") in which the display control program and various kinds of data are stored so as to be readable by a computer (or a CPU); and a random access memory (RAM) in which the display control program is loaded. An object of the present invention can be achieved by a computer (or a CPU) reading and executing the display control program stored in the storage medium. Examples of the storage medium encompass "a non-transitory tangible medium" such as a tape, a disk, a card, a semiconductor memory, and a programmable logic circuit. The display control program can be supplied to the computer via any transmission medium (such as a communication network or a broadcast wave) which allows the display control program to be transmitted. Note that the present invention can also be achieved in the form of a computer data signal in which the display control program is embodied via electronic transmission and which is embedded in a carrier wave.

[Main Points]

A display control device in accordance with a first aspect of the present invention is a display control device (display control sections 201 through 204), which controls a display panel to display image data by switching between at least two frame rates, the display control device including: an image data update determining section (image update determining section 21) configured to determine, for each preset image data update period, whether externally-supplied image data is updated; and a first frame rate setting section 22 configured to set a frame rate in accordance with a determination result determined by the image data update determining section (image update determining section 21).

With the above configuration, the frame rate is set in accordance with whether image data to be transmitted to the display panel is updated.

In a case where, for example, the image data to be transmitted to the display panel is updated, it is possible to cause the display panel to smoothly display image data by setting the frame rate to be equal to or higher than that set in a previous image data update determination. That is, in a case where the image data to be transmitted to the display panel is updated, no performance is required to smoothly display movements in image data. Therefore, in a case where the frame rate is set comparatively high (e.g., 120 Hz), the frame rate is set to be equal to that set in a previous image data update determination. In a case where the frame rate is set comparatively low (e.g., 60 Hz), the frame rate is set to be higher than that set in a previous image data update determination. This makes it possible to cause the display panel to smoothly display image data.

In contrast, in a case where no image data to be transmitted to the display panel is updated, it is possible to reduce electric power, to be consumed to display image data, by setting the frame rate to be equal to or lower than that set in a previous image data update determination. That is, in a case where no image data to be transmitted to the display panel is updated, image data to be displayed is, for example, still image data involving no movements and therefore no performance is required. Therefore, in a case where the frame rate is set comparatively low (e.g., 60 Hz), the frame rate is set to be equal to or lower than that set in a previous image data update determination. In a case where the frame rate has been set comparatively high (e.g., 120 Hz), the frame rate is set to be lower than that set in a previous image data update determination. This makes it possible to reduce electric power to be consumed to display image data.

The display control device in accordance with a second aspect of the present invention can be configured such that, in the first aspect of the present invention, the image data update determining section determines whether image data stored in an image data storing section is updated, the image data storing section storing image data which (i) is externally supplied and (ii) is to be transmitted to the display panel.

The display control device in accordance with a third aspect of the present invention can be configured such that, in the first or second aspect of the present invention, in a case where the image data update determining section (image update determining section 21) determines that the image data is not updated, the first frame rate setting section 22 sets the frame rate to be lower than a frame rate which was set in a previous image data update determination.

With the above configuration, in a case where the image data update determining section determines that no image data is updated, the frame rate is always set to be lower than that set in a previous image data update determination. This makes it possible to reduce electric power consumption.

The display control device in accordance with a fourth aspect of the present invention can be configured to further include, in any one of the first through third aspects of the present invention, a second frame rate setting section 24 via which a user sets an upper limit of the frame rate, the first frame rate setting section 22 sets the frame rate to have the upper limit which the user has set via the second frame rate setting section 24.

With the above configuration, the frame rate set by the user is used as the upper limit of the frame rate of the display panel. This makes possible to cause the display panel to display image data at a frame rate in accordance with the user's demand.

The display control device in accordance with a fifth aspect of the present invention can be configured to further include, in any one of the first through fourth aspect of the present invention, a remaining battery power checking section (remaining battery power detecting section 601) configured to check remaining battery power of an electronic device (display devices 1 through 4) which includes the display control device; and a third frame rate setting section 25 configured to set an upper limit of the frame rate in accordance with the remaining battery power checked by the remaining battery power checking section (remaining battery power detecting section 601), the first frame rate setting section 22 setting the frame rate to have the upper limit set by the third frame rate setting section 25.

With the above configuration, the upper limit of the frame rate is reduced in accordance with the remaining battery power. This makes it possible to reduce electric power consumed from a battery.

The display control device in accordance with a sixth aspect of the present invention can be configured such that, in any one of the first through fifth aspect of the present invention, an upper limit of a frame rate, at which the display panel 101 displays image data of an application which is being executed, is preset for each application to be executed in an electronic device (display devices 1 through 4) which includes the display control device, the display control device further including: an application execution determining section 701 configured to determine an application which is being executed; and the application execution determining section 701 transmitting, to the first frame rate setting section 22, an identifying signal which indicates the application which is being executed and is determined by the application execution determining section 701, the first frame rate setting section 22 causing the frame rate to have an upper limit which is associated with the application.

According to the above configuration, when an application is executed, image data is efficiently displayed at the frame rate whose upper limit is restricted for that application, without making any special operation.

A method of controlling a display in accordance with a seventh aspect of the present invention is a method of controlling a display panel to display image data by switching between at least two frame rates, the method including the steps of: (a) determining, for each preset image data update period, whether externally-supplied image data is updated; and (b) setting a frame rate in accordance with a determination result determined in the step (a).

The above configuration brings about an effect similar to that brought about by the first aspect of the present invention.

The display control sections 201 through 204 in accordance with the foregoing aspects of the present invention each can be realized by a computer. In such cases, the present invention covers (i) a control program for each of the display control sections 201 through 204, which program causes a computer to operate as each section of the display control sections 201 through 204 so that each of the display control sections 201 through 204 can be realized by a computer; and a computer-readable storage medium storing therein the control program.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a display device in which a frame rate can be changed and an electronic device including such a display device. Out of such electronic devices, the present invention is particularly applicable to an electronic device which operates with use of a battery, for example to a portable information terminal such as a smartphone.

REFERENCE SIGNS LIST 1, 2, 3, 4: Display device
21: Image update determining section (image data update determining section)
22: First frame rate setting section
23: Image data transmitting section
24: Second frame rate setting section
25: Third frame rate setting section
26: Fourth frame rate setting section
101: Display panel
201 through 204: Display control section
301: Display image creating section
401: Image data storing section 501: Frame rate instructing section
601: Remaining battery power detecting section (remaining battery power checking section)
701: Application execution determining section

The invention claimed is:

1. A display control device, which controls a display panel to display image data by switching between at least two frame rates, the display control device comprising:
   image data update determining circuitry that determines, for each preset image data update period, whether externally-supplied image data is updated;
   first frame rate setting circuitry that sets a frame rate in accordance with a determination result determined by the image data update determining circuitry; and
   second frame rate setting circuitry via which a user sets an upper limit of the frame rate, wherein
   if it is determined that no image data is updated, the frame rate is set based on whether the image data was displayed in a previous frame,
   the first frame rate setting circuitry sets the frame rate to have the upper limit which the user has set via the second frame rate setting circuitry, and
   in a case where the image data update determining circuitry determines that the image data is not updated, the first frame rate setting circuitry reduces the frame rate by suspending a transmission of the image data to the display panel by securing an idle period, during which none of the image data is transmitted, by thinning out a given number of frames from a data transmission interval of a frame rate which was set in a previous image data update determination.

2. The display control device as set forth in claim 1, wherein:
   the image data update determining circuitry determines whether image data stored in an image data storage is updated, and
   the image data storage stores image data which (i) is externally supplied and (ii) is to be transmitted to the display panel.

3. The display control device as set forth in claim 1, wherein:
   in a case where the image data update determining circuitry determines that the image data is not updated, the first frame rate setting circuitry sets the frame rate to be lower than a frame rate which was set in a previous image data update determination.

4. A method of controlling a display panel to display image data by switching between at least two frame rates, the method comprising:
   (a) determining, for each preset image data update period, whether externally-supplied image data is updated;
   (b) setting a frame rate in accordance with a determination result determined in the step (a); and
   (c) setting an upper limit of the frame rate in response to a user input, wherein
   if it is determined that no image data is updated, the frame rate is set based on whether the image data was displayed in a previous frame, and
   in a case where it is determined that the image data is not updated, the frame rate is reduced by suspending a transmission of the image data to the display panel by securing an idle period, during which none of the image data is transmitted, by thinning out a given number of frames from a data transmission interval of a frame rate which was set in a previous image data update determination.

5. The method of controlling a display panel as set forth in claim 4, the method further comprising:
   (d) updating the frame rate to match a frame rate of the display panel; and
   (e) reducing the frame rate by half when no image data is updated.

6. A non-transitory computer-readable recording medium in which a display control program causes a computer to perform:
   (a) determining, for each preset image data update period, whether externally-supplied image data is updated;
   (b) setting a frame rate in accordance with a determination result determined in the step (a); and
   (c) setting an upper limit of the frame rate in response to a user input, wherein
   if it is determined that no image data is updated, the frame rate is set based on whether the image data was displayed in a previous frame, and
   in a case where it is determined that the image data is not updated, the frame rate is reduced by suspending a transmission of the image data to the display panel by securing an idle period, during which none of the image data is transmitted, by thinning out a given number of frames from a data transmission interval of a frame rate which was set in a previous image data update determination.

7. The display control device as set forth in claim 1, further comprising display image creating circuitry that sets the frame rate to match a frame rate of the display panel when the image data is updated, and reduces the frame rate by half when no image data is updated.

8. The non-transitory computer-readable recording medium of claim 6, causing a computer to further perform:
   (d) updating the frame rate to match a frame rate of the display panel; and
   (e) reducing the frame rate by half when no image data is updated.

* * * * *